United States Patent Office 3,684,729
Patented Aug. 15, 1972

3,684,729
BRIGHTENER COMPOSITIONS
Robert J. Tuite, Kodak Park,
Rochester, N.Y. 14650
No Drawing. Filed Oct. 2, 1969, Ser. No. 863,364
Int. Cl. C09k 1/02; G03c 1/92
U.S. Cl. 252—301.2 W                         6 Claims

ABSTRACT OF THE DISCLOSURE

Hydrophilic colloids having intimately dispersed therein an essentially hydrophobic solid solution of an oil-soluble brightening agent in an essentially hydrophobic organic solvent that is rigid (an organic glass) at room temperature, i.e., has a glass transition temperature (Tg) that is above about 25° C. and is a polymer that is an acetal condensation product of polyvinyl alcohol and an aldehyde or ketone having from 2 to 40 carbon atoms are advantageously used in photographic elements and in image receiving elements for image diffusion transfer because the light-stability of the brightening agents in these dispersions is increased substantially over the light-stability of the same brightening agents in dispersions outside the immediate invention.

---

This invention relates to brightening compositions having greatly improved stability, a method for improving the stability of brighteners, and photographic materials containing brightener compositions having improved stability.

The highlight areas of photographic color prints and other products, such as, fibrous or plastic articles are often made to look whiter by incorporating optical brightening agents. These brightening agents fluoresce under radiation with ultraviolet light, emitting visible light, usually bluish in hue thus enhancing the whiteness of the object. Such products also frequently contain ultraviolet sensitive ingredients such as dyes, organic polymers, etc., which require protection from irradiation in the ultraviolet region, especially from 360–400 mμ. Brighteners are inherently ultraviolet absorbers and depend on this characteristic for the energy required to fluoresce in the visible region of the spectrum. Most of the known brightening agents are decomposed by prolonged exposure to ultraviolet radiation, and thus lose their ability to fluoresce and serve as brightening agents, oil-soluble brightening agents, such as a brightener based on vinylene, a coumarin, a thiophene, a furan, an anthracene, a pyrazoline, a fluorene, a carbazole, a 1,8-naphthalic acid imide and a 2-oxo-2,4-dihydrofuro[2,3-b] quinoxaline, are well known brightening agents and are brighteners which absorb and fluoresce in desirable regions of the spectrum. These brightening agents, however, do not have the desired stability to prolonged exposure to radiation.

It is known to use high boiling solvents, such as, benzyl alcohol, diethyl esters of phthalic acid, etc., which are wholly or partly replaced by resins such as polystyrene, polyvinyl acetate, and an ester of polyacrylic acid, to dissolve brighteners such as stilbene for dispersing in aqueous gelatin solution before coating photographic elements. Such methods are described in German Pat. 1,150,274. However, brightening compositions made by these methods either have low fluorescence or do not have the desired stability to prolonged exposure to light.

It is therefore an object of my invention to provide novel brightener compositions which have substantially improved stability to prolonged exposure to light.

It is another object of my invention to provide a method for making my novel brightener compositions which have greatly improved stability to prolonged exposure to light.

Another object of my invention is to provide novel photographic elements and image-receiving elements which contain my novel brightener compositions.

These and still other objects will become apparent from a consideration of the following specifications and claims.

These and other objects are accomplished according to my invention by the preparation and use of my novel brightener compositions in photographic elements and in image-receiving elements. My brightener compositions comprise hydrophilic colloids having intimately dispersed therein an essentially hydrophobic solid solution of an oil-soluble brightening agent in an essentially hydrophobic organic solvent that is rigid (an organic glass) at room temperature, i.e., has a glass transition temperature (Tg) above about 25° C. and are polymers containing recurring units of vinylacetals, i.e., polymers that are acetal condensation products of polyvinyl alcohol and an aldehyde or ketone having from 2 to 40 carbon atoms. In my brightener compositions, substantially all of the brightening agent is dissolved in the rigid solvent. My brightening compositions are valuable because they have unexpectedly good stability to prolonged exposure to ultraviolet radiation. My brightening compositions are advantageously made by dissolving any oil-soluble brightening agent in a rigid organic permanent polymeric solvent containing recurring units of vinylacetals, and a temporary liquid solvent and then dispersing the resulting hydrophobic liquid solution into an aqueous hydrophilic colloid solution. The temporary solvent is then removed by evaporation or washing, leaving the dispersion of particles of the solid solution of my brightening agent in the permanent, rigid, polymeric solvent so the particles have average diameters that are very small, usually less than .4 micron and preferably less than .1 micron. It is important that my brightener solution particles be dispersed in an aqueous hydrophilic colloid binder.

Oil-soluble brightening agents used to advantage in my brightening compositions include vinylene brighteners, coumarins, thiophenes (e.g., thiophenes, dibenzthiophenes, 1,1-dioxydibenzthiophenes, etc.), furans (e.g., furans, dibenzfurans, etc.), anthracenes, pyrazolines, fluorenes, carbazoles, 1,8-naphthalic acid imides, 2-oxo-2,4-dihydrofuro [2,3-b]quinoxalines, etc.

Included among the oil-soluble vinylene brightening agents used to advantage are the diheterocyclic substituted vinylenes, the diheterocyclic substituted styrenes and the heterocyclic substituted stilbenes described by the formula:

(I) 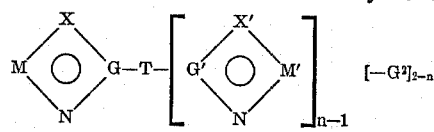

wherein T represents a bivalent vinylene group (e.g., vinylene, a styrene group, a stilbene group, etc.); G and G' each represent a member such as C, CNH or N; X and X' each represent a member such as O, S and NR, N and CR; such that when G and G' each represent C, then X and X' each represent a member such as O, S and NR, and such that when G and G' each represent N, then X and X' each represent a member such as N and CR; R represents a member, such as, hydrogen, an alkyl group having from 1 to 22 carbon atoms (e.g., methyl, ethyl, benzyl, phenethyl, decyl, dodecyl, docosyl, etc.) and an aryl group, preferably a phenyl group (e.g., phenyl, tolyl, chlorophenyl, ethylphenyl, bromophenyl, etc.); M and M' each represent the nonmetallic atoms required to complete a 5 to 6 membered heterocyclic ring, such as, an oxazole group, a benzoxazole group, a naphthoxazole group, a thiazole group, a benzothiazole group, a naphthathiazole group, an imidazole group, a benzimidazole group, a naphthimidazole group, a triazole group, a benzotriazole group, a naphthotriazole group, and a triazinyl group; such that when M and M' represent the atoms to complete triazinyl groups, G and G' each represent CNH; $n$ is an integer of from 1 to 2; $G^2$ represents a member, such as, hydrogen, an alkyl group and an aryl group.

My oil-soluble vinylene brightening agents are also advantageously described by the formula:

(II)
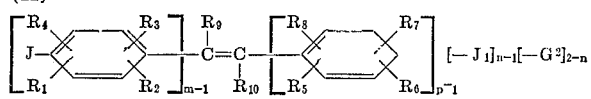

wherein $n$ represents an integer of from 1 to 2; $m$ and $p$ each represent an integer of from 1 to 2, such that when $n$ is 1, $p$ is 2; J represents a group such as a

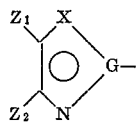

group, or a

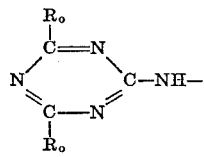

group, etc.; $J_1$ represents a group, such as, a

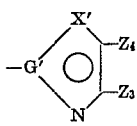

group, a

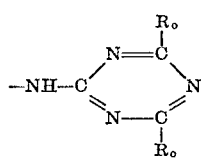

group, etc.; $R_0$ represents a member such as an amino, a halogen (e.g., chlorine, bromine, etc.), an alkyl group, particularly alkyl having from 1 to 15 carbon atoms (e.g. methyl, benzyl, phenylethyl, butyl, cyclohexyl, decyl, pentadecyl, etc.), an aryl group (e.g., phenyl, tolyl, ethylphenyl, ethoxyphenyl, etc.), an alkoxy group (e.g., methoxy, butoxy, pentadecyloxy, etc.), an aryloxy group (e.g., phenoxy, tolyoxy, etc.), etc.; G, G', $G^2$, X and X' are as defined previously; $R_1$, $R_2$, $R_3$, $R_4$, $R_5$, $R_6$, $R_7$ and $R_8$ each represents any monovalent substituent which does not destroy the desirable fluorescent properties of the vinylene brighteners including such members as hydrogen, a halogen atom (e.g., chlorine, bromine, fluorine and iodine atoms), hydroxyl, an acyl group (e.g., acetyl, butyryl, dodecoyl, benzoyl, etc.), an acyloxy group (e.g., acetoxy, butyryloxy, dodecoyloxy, benzoyloxy, etc.), an amino group (e.g., amino, ethylamino, diethylamino, hydroxyethylamino, methoxyethylamino, benzylamino, cyclohexyamino, phenylamino, octadecylamino, docosylamino, etc.), a sulfonyl group, such as an alkylsulfonyl group (e.g., methylsulfonyl, benzylsulfonyl, dodecylsulfonyl, docosylsulfonyl, etc.), an arylsulfonyl group, such as, a phenylsulfonyl group (e.g., phenylsulfonyl, tolysulfonyl, ethoxyphenylsulfonyl, chlorophenylsulfonyl, etc.), a naphthylsulfonyl (e.g., α-naphthylsulfonyl, β-naphthylsulfonyl, etc.), a sulfamyl group (e.g., sulfamyl, N-methylsulfamyl, N,N-dimethylsulfamyl, N - docosylsulfamyl, N-benzylsulfamyl, N-phenylsulfamyl, N-tolylsulfamyl, N-chlorophenylsulfamyl, etc.), cyano, thiocyano, thiol, a carbamyl group (e.g., carbamyl, N-methylcarbamyl, N,N-dimethylcarbamyl, N-benzylcarbamyl, N-docosylcarbamyl, N-tolylcarbamyl, N-(chlorophenyl)carbamyl, N-(α-naphthyl)carbamyl, etc.), a carbamyloxy group (e.g., carbamoyloxy, methylcarbamoyloxy, butylcarbamoyloxy, phenylcarbamoyloxy, α-naphthylcarbamoyloxy, etc.), an alkyl group having from 1 to 22 carbon atoms, e.g., methyl, benzyl, ethyl, phenethyl, ethylphenethyl, isopropyl, butyl, t-butyl, 2,2-difluoroethyl, 4,4-difluoro-n-butyl, 2,2,2-trifluoroethyl, 6,6,6-trifluoro-n-hexyl, hexyl, cyclohexyl, octyl, decyl, octadecyl, docosyl, etc.), an alkoxy group having from 1 to 22 carbon atoms (e.g., methoxy, ethoxy, phenethoxy, butoxy, decyloxy, pentadecyloxy, octadecyloxy, docosyloxy, etc.), an aryl group, such as, a phenyl group, (e.g., phenyl, tolyl, ethylphenyl, chlorophenyl, bromophenyl, methoxyphenyl, ethoxyphenyl, etc.), a naphthyl group (e.g., α-naphthyl, β-naphthyl, etc.), an aryloxy group, such as, a phenoxy group (e.g., phenoxy, tolyoxy, chlorophenoxy, hydrophenoxy, etc.), a naphthyloxy group (e.g., α-naphthoxy, β-naphthoxy, etc.), a furyl group, a thienyl group, a

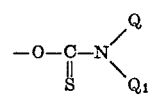

—NHSO$_2$Q group, a

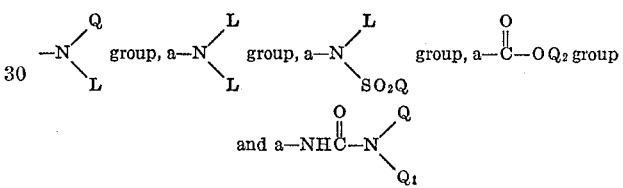

and a
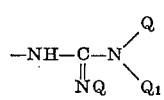

group; Q and $Q_1$ each represent a hydrogen atom, an alkyl group (e.g., methyl, ethyl, butyl, decyl, cyclobutyl, cyclohexyl, methoxyethyl, chloroethyl, etc.), an aryl group, preferably a phenyl group (e.g., phenyl, tolyl, ethylphenyl, methoxyphenyl, ethoxyphenyl, chlorophenyl, bromophenyl, etc.); $Q_2$ represents an alkyl group or an aryl group, each as described for Q; L represents an acyl group (e.g., acetyl, butyryl, dodecoyl, benzoyl, etc.), a ureido group, a —SO$_2$Q group and a

—NH—C—N⟨$^Q_{Q_1}$
     ‖
     NQ group; Q and $Q_1$ are as defined previously; $R_9$ and $R_{10}$ can be any monovalent substituent that does not destroy the desirable fluorescent properties of the stilbene compound, including hydrogen, alkyl having from 1 to 15 carbon atoms (e.g., methyl, ethyl, butyl, 2-ethylhexyl, pentadecyl, etc.), an aryl group, preferably a phenyl group (e.g., phenyl, tolyl, methoxyphenyl, chlorophenyl, bromophenyl, etc.); $Z_1$, $Z_2$, $Z_3$ and $Z_4$ each represent a member, such as, hydrogen, an alkyl group having from 1 to 22 carbon atoms as defined previously for $R_1$, an aryl group including a phenyl group as defined previously for $R_1$ and a naphthyl group as previously defined for $R_1$, and $Z_1$ taken together with $Z_2$, and $Z_3$ taken together with $Z_4$ represent the nonmetallic atoms required to complete rings represented by the formulas

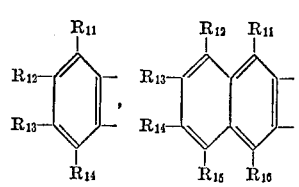

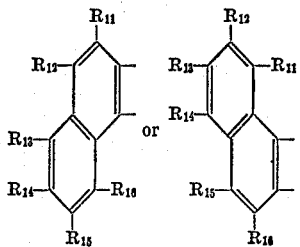

such that the unsubstituted carbons in these rings are also in the heterocyclic rings to which they are fused; $R_{11}$, $R_{12}$, $R_{13}$, $R_{14}$, $R_{15}$ and $R_{16}$ each represent a member, such as hydrogen, a halogen, hydroxyl, an acyl group, an acyloxy group, an amino group, a substituted sulfonyl group, a sulfamyl group, cyano, thiocyano, thiol, a carbamyl group, an alkyl group, an alkoxy group, an aryl group, an aryloxy group, furyl, and thienyl, each as defined previously for $R_1$ through $R_8$.

Typical examples or oil-soluble vinylene brightening agents used to advantage according to my invention are the following:

(1) 4-(5,7-di-t-amylbenzothiazol-2-yl)-4'-(4-octyloxazol-2-yl)stilbene
(2) 4,4'-bis(5-octylbenzoxazol-2-yl)-α-methylstilbene
(3) 4-(α-naphthotriazol-2-yl-3,3'-octylstilbene
(3) 4-(α-naphthotriazol-2-yl3-3'-octylstilbene
(4) 4,2'-bis(benzoxazol-2-yl)stilbene
(5) 4,4'-bis(5,7-di-t-amylbenzoxazol-2-yl)stilbene
(6) 4,4'-bis(5,7-di-octylbenzoxazol-2-yl)stilbene
(7) 4,4'-bis(5,7-di-docosylbenzoxazol-2-yl)stilbene
(8) 4,4'-bis(5,7-di-t-amylbenzothiazol-2-yl)stilbene
(9) 4-(5,7-di-t-amylbenzoxazol-2-yl)-4'-phenylstilbene
(10) 4-(5,7-di-t-amylbenzoxazol-2-yl)-4'-(α-naphthyl)stilbene
(11) 4,4'-bis(benzoxazol-2-yl)-2-methylstilbene
(12) 4,4'-bis(benzoxazol-2-yl)-α-cyanostilbene
(13) 4,4'-bis(benzoxazol-2-yl)-2,2'-dimethylstilbene
(14) 4,4'-bis(6-methoxybenzoxazol-2-yl)stilbene
(15) 4,4'-bis(benzoxazol-2-yl)-2-nitrostilbene
(16) 4,4'-bis(benzoxazol-2-yl)-2-aminostilbene
(17) 4,4'-bis(benzoxazol-2-yl)-2-hydroxystilbene
(18) 4,4'-bis(benzoxazol-2-yl)-2-chlorostilbene
(19) 4,4'-bis(benzoxazol-2-yl)-2-cyanostilbene
(20) 4,4'-bis(6-octylbenzimidazol-2-yl)stilbene
(21) 4,4'-bis(6-methylsulfonylbenzoxazol-2-yl)stilbene
(22) 4,4'-bis(6-cyanobenzoxazol-2-yl)stilbene
(23) 4,4'-bis(6-acetylbenzoxazol-2-yl)stilbene
(24) 4,4'-bis(6-trifluoromethylbenzoxazol-2-yl)stilbene
(25) 4,4'-bis(6-carbethoxybenzoxazol-2-yl)stilbene
(26) 4,4'-bis(6-phenoxybenzoxazol-2-yl)stilbene
(27) 4,4'-bis(6-dimethylsulfamylbenzoxazol-2-yl)stilbene
(28) 4,4'-bis(6-dimethylcarbamylbenzoxazol-2-yl)stilbene
(29) 4,4'-bis(6-thiocyanobenzoxazol-2-yl)stilbene

(30) 4,4'-bis(6-N(COOCH₃)(CH₃) benzoxazol-2-yl)stilbene

(31) 4,4'-bis(6-chlorobenzoxazol-2-yl)stilbene
(32) 4,4'-bis(6-bromobenzoxazol-2-yl)stilbene
(33) 4,4'-bis(benzoxazol-2-yl)-2-methylsulfonylstilbene
(34) 4,4'-bis((benzoxazol-2-yl)-2-dimethylsulfamylstilbene
(35) 4,4'-bis(benzoxazol-2-yl)-2-acetylstilbene
(36) 4,4'-bis(benzoxazol-2-yl)-2-thiocyanostilbene
(37) 4,4'-bis(benzoxazol-2-yl)-2-trifluoromethylstilbene
(38) 4,4'-bis(benzoxazol-2-yl)-2-carbomethoxystilbene

(39) 4,4'-bis(benzoxazol-2-yl)-2-N(COOCH₃)(CH₃) stilbene

(40) 4,4'-bis(6-methoxybenzoxazol-2-yl)-α,β-diethylstilbene
(41) 4,4'-bis(6-chlorobenzoxazol-2-yl)-α,β-diethylstilbene
(42) 4,4'-bis(6-ethylsulfonylbenzoxazol-2-yl)-α,β-diethylstilbene
(43) 4,4'-bis(6-dimethylsulfamylbenzoxazol-2-yl)-α,β-diethylstilbene
(44) 4,4'-bis(6-dimethylcarbamylbenzoxazol-2-yl)-α,β-diethylstilbene
(45) 4,4'-bis(6-trifluoromethylbenzoxazol-2-yl)-α,β-diethylstilbene
(46) 4,4'-bis(6-difluoromethylbenzoxazol-2-yl)-α,β-diethylstilbene
(47) 4,4'-bis(6-bromobenzoxazol-2-yl)-α,β-diethylstilbene
(48) 4,β-di(5,7-di-t-amylbenzoxazol-2-yl) styrene
(49) 4,β-di(5,7-dioctadecylbenzoxazol-2-yl) styrene
(50) 4,β-di(α-naphthotriazol-2-yl) styrene
(51) 4,β-di(β-naphthimidazol-2-yl) styrene
(52) 4,4'-bis(5-ethylsulfonylbenzoxazol-2-yl)-α,β-diethylstilbene
(53) 4,4'-bis(5-dimethylsulfamylbenzoxazol-2-yl)-α,β-diethylstilbene
(54) 4,4'-bis(5-dimethylcarbamylbenzoxazol-2-yl)-α,β-diethylstilbene
(55) 4,4'-bis(5-carbethoxybenzoxazol-2-yl)-α,β-diethylstilbene
(56) 4,4'-bis(5-hydroxybenzoxazol-2-yl)-α,β-diethylstilbene
(57) 4,4'-bis(5-acetamidobenzoxazol-2-yl)-α,β-diethylstilbene
(58) α,β-bis(5,7-dioctadecylbenzoxazol-2-yl) ethylene
(59) α,β-bis(6-phenoxybenzathiazol-2-yl) ethylene
(60) α,β-bis(α-naphthimidazol-2-yl) ethylene
(61) α,β-bis(α-naphthotriazol-2-yl) ethylene
(62) 4,4'-bis(6-bromobenzoxazol-2-yl)-2-chlorostilbene
(63) 4,4'-bis(6-cyanobenzoxazol-2-yl)-2-chlorostilbene
(64) 4,4'-bis(6-acetylbenzoxazol-2-yl)-2-chlorostilbene
(65) 4,4'-bis(6-methoxybenzoxazol-2-yl)-2-acetamidostilbene
(66) 4,4'-bis(6-acetamidobenzoxazol-2-yl)-2-acetamidostilbene
(67) 4,4'-bis(6-cyanobenzoxazol-2-yl)-2-acetamidostilbene
(68) 4,4'-bis(6-thiocyanobenzoxazol-2-yl)-2-acetamidostilbene
(69) 4,4'-bis(6-methylbenzoxazol-2-yl)-2-acetamidostilbene
(70) 4,4'-bis(6-dimethylsulfamylbenzoxazol-2-yl)-2-acetamidostilbene
(71) 4,4'-bis(6-methoxybenzoxazol-2-yl)-2,2'-dimethylstilbene
(72) 4,4'-bis(6-ethoxybenzoxazol-2-yl)-2,2'-dimethylstilbene
(73) 4,4'-bis(6-dimethylsulfamylbenzoxazol-2-yl)-2,2'-dimethylstilbene
(74) 4,4'-bis(6-thiomethylbenzoxazol-2-yl)-2,2'-dimethylstilbene
(75) 4,4'-bis(6-cyanobenzoxazol-2-yl)-2,2'-dimethylstilbene
(76) 4,4'-bis(6-acetamidobenzoxazol-2-yl)-2,2'-dimethylstilbene
(77) 4,4'-bis(5-chlorobenzoxazol-2-yl)-2-chlorostilbene
(78) 4,4'-bis(5-methoxybenzoxazol-2-yl)-2-methylstilbene
(79) 4,4'-bis(5-bromobenzoxazol-2-yl)-2-methylstilbene
(80) 4,4'-bis[4,6-diphenyl-s-triazinyl(2)amino]stilbene
(81) 4,4'-bis(5-dimethylsulfamylbenzoxazol-2-yl)-2-methylstilbene
(82) 4,4'-bis(5-trifluoromethylbenzoxazol-2-yl)-2-methylstilbene
(83) 4,4'-bis(5-iodobenzoxazol-2-yl)-2-methylstilbene
(84) 4,4'-bis(5-methoxybenzoxazol-2-yl)-2-cyanostilbene
(85) 4,4'-bis(5-methylbenzoxazol-2-yl)-2-cyanostilbene
(86) 4,4'-bis(5-p-methoxyphenylbenzoxazol-2-yl)-2-cyanostilbene

(87) 4,4'-bis(5-trifluoromethylbenzoxazol-2-yl)-2-cyanostilbene
(88) 4,4'-bis(5-carbomethoxybenzoxazol-2-yl)-2-cyanostilbene
(89) 4,4'-bis(5-acetamidobenzoxazol-2-yl)-2-cyanostilbene
(90) 4,4'-bis(5-cyanobenzoxazol-2-yl)-2-cyanostilbene
(91) 4,4'-bis[4,6-dichloro-s-triazinyl(2)amino]stilbene
(92) 4,4'-bis(6-phenoxybenzoxazol-2-yl)-α-cyanostilbene
(93) 4,4'-bis(6-[p-methoxyphenoxy]benzoxazol-2-yl)-α-cyanostilbene
(94) 4,4'-bis(6-carbomethoxybenzoxazol-2-yl)-α-cyanostilbene
(95) 4,4'-bis[4,6-diphenoxy-s-triazinyl(2)amino]stilbene
(96) 4,4'-bis(5-ethoxybenzoxazol-2-yl)-α-cyano-2-methyl-3'-chlorostilbene
(97) 4,4'-bis[4,6-dimethoxy-s-triazinyl(2)amino]stilbene Coumarin brightening agents used to advantage include those in the formula:

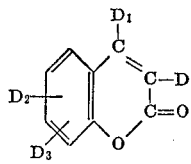

(III)

wherein D and $D_1$ each represent a member, such as, hydrogen, an alkyl group (e.g., methyl, benzyl, propyl, amyl, octadecyl, docosyl, etc.), an aryl group, particularly a phenyl group (e.g., phenyl, tolyl, ethyl phenyl, triazinylaminophenyl, etc.); $D_2$ and $D_3$ each represent a member, such as, hydrogen, an alkyl group (e.g., methyl, phenethyl, amyl octadecyl, etc.), an alkoxy group (e.g., methoxy, ethoxy, amyloxy, pentadecyloxy, etc.), an aryl group (e.g., phenyl, tolyl, methoxyphenyl, α-naphthyl, β-naphthyl, etc., an aryloxy group (e.g., phenoxy, tolyloxy, etc.), an amino group (e.g., amino, dimethylamino, butylamino, anilino, diphenylamino, triazinylamino, 4,6-dichloro-s-triazinylamino, 4,6 - dimethyl-s-triazinylamino, 4,6 - diphenoxy-s-triazinylamino, ureido, 2-dimethylaminoethyluredio, etc.), a heterocyclic group (e.g., a pyrazolyl group, a triazol-2-yl group, such as triazol-2-yl, benzotriazol-2-yl, [4,5-a]naphthotriazol - 2 - yl, [4,5-b]naphthotriazol-2-yl, etc.), and taken together $D_2$ and $D_3$ represent the nonmetallic atoms required to complete a benzene ring.

Typical coumarins used to advantage include the following:

7-diethylamino-4-methylcoumarin
3-ethoxycarbonylbenzo(f)coumarin
3-phenyl-7-[2-(dimethylaminoethyl)ureido]coumarin
4,6-dimethyl-7-methylaminocoumarin
3-phenyl-7-ureido coumarin
3-phenyl-7-[4',6'-dichloro-s-triazinyl-(2')amino]-coumarin
3-phenyl-7-[4',6'-dimethoxy-s-triazinyl(2')amino]-coumarin
3-phenyl-7-[4'6'-dimethylmercapto-s-triazinyl(2')amino]-coumarin
3-phenyl-7-[4',6'-diphenylmercapto-s-triazinyl(2')amino]-coumarin
3-phenyl-7-[4',6'-diphenoxy-s-triazinyl-(2')amino]-coumarin
3-phenyl-7-[4'-methoxy-6'-methylmercapto-s-triazinyl-(2')amino]-coumarin
3-phenyl-7-[4'-methoxy-6'-phenylmercapto-s-triazinyl-(2')amino]-coumarin
3-phenyl-7-[4'-methoxy-6'-phenoxymercapto-s-triazinyl-(2')amino]-coumarin
3-phenyl-7-[4'-chloro-6'-diethylamino-s-triazinyl-(2')amino]-coumarin
3-phenyl-7-[4',6'-dichloro-s-triazinyl-(2')ureido]-coumarin
3-phenyl-7-([4,5-a]naphthotriazol-2-yl)-coumarin
3-methyl-7-pyrazolyl coumarin Oil-soluble thiophene, furan, thiazole and oxazole brightening agents used to advantage are included in the formula:

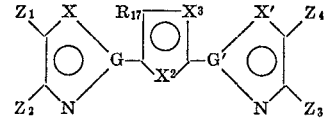

wherein X, X', $Z_1$, $Z_2$, $Z_3$, $Z_4$, G and G' are as defined previously; $X^2$ represents O, S, NR; $X^3$ represents N or $CR_{18}$; $R_{17}$ and $R_{18}$ each represent a member, such as, hydrogen, an alkyl group, preferably having from 1 to 15 carbon atoms (e.g., methyl, ethyl, benzyl, butyl, amyl, decyl, pentadecyl, etc.), an aryl group (e.g., phenyl, tolyl, ethoxyphenyl, etc.), a heterocyclic group, e.g., a $Z_2$

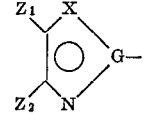

group, etc.; and oil-soluble dibenzthiophene, 1,1-dioxydibenzthiophene, dibenzfuran, fluorene and carbazole brightening agents used advantageously are included in the formula:

(V)

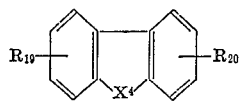

wherein $R_{19}$ and $R_{20}$ represent a member, such as, hydrogen, an alkyl group, preferably having from 1 to 15 carbon atoms (e.g., methyl, benzyl, propyl, amyl, decyl, pentadecyl, etc.), an aryl group (e.g., phenyl, tolyl, ethoxyphenyl, etc.), etc.; $X_4$ represents a member, such as, $SO_2$, $CH_2$,

NR, O, S, etc.; and R is as defined on page 4.

Typical examples of brighteners of Formulas IV and V include:

2,5-bis(benzoxazol-2-yl) thiophene
2,5-bis(bis(5,7-di-t-amylbenzoxazol-2-yl) thiophene
2,5-bis(5,7-di-t-amylbenzoxazol-2-yl) thiophene
2,5-bis(4,6-diphenoxybenzothiazol-2-yl) thiophene
2,5-bis(α-naphthimidazol-2-yl) thiophene
2,4,5-tri(benzoxazol-2-yl) thiazole
2,5-di(benzoxazol-2-yl)-4-phenylthiophene
2,5-di(α-naphthotriazole-2-yl) thiazole
1,1-dioxydibenzthiophene
1,1-dioxy-6-methyldibenzthiophene
6-ethyldibenzthiophene
5-ethyldibenzfuran
1-phenylcarbazole
1-ethylcarbazole
fluorene
5-ethylfluorene
5,5-dipentylfluorene
1-phenylfluorene Oil-soluble anthracene brightening agents used to advantage are included in the formula:

(VI)

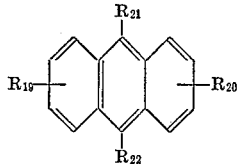

wherein $R_{19}$ and $R_{20}$ are as defined previously; and $R_{21}$ and $R_{22}$ represent a member such as hydrogen, an aryl group (e.g., a phenyl group, such as, phenyl, tolyl, ethylphenyl, etc. and naphthyl) and the cyano group, such that no more than one of $R_{21}$ and $R_{22}$ is hydrogen.

Typical examples of anthracene brightening agents include:

9-cyanoanthracene
9,10-dicyanoanthracene
9-cyano-10-phenylanthracene
9,10-diphenylanthracene
9-naphthylanthracene Oil-soluble pyrazoline brightening agents used to advantage include those of the formula:

(VII) 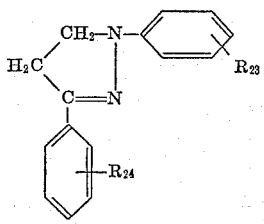

wherein $R_{23}$ represents a group, such as, a carboxylic acid alkyl ester (e.g., methoxycarbonyl, a sulfonic acid amide group, etc.), hydrogen, an alkyl group, an aryl group, etc., and $R_{24}$ represents hydrogen, a halogen atom, an alkyl group (e.g., methyl, ethyl, amyl, pentadecyl, etc.), an aryl group (e.g., phenyl, tolyl, etc.). Typical examples include the following:

1 - (4 - methylcarbonyloxyphenyl)-3-pentadecylphenylpyrazoline
3-chlorophenyl-1-(4-methylcabonyloxyphenyl)pyrazoline Oil-soluble 1,8-naphthalic acid imide brightening agents used to advantage are represented by the formula:

(VIII) 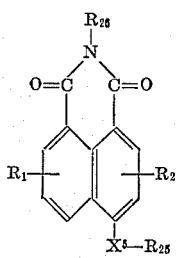

wherein $R_1$ and $R_2$ are as defined in col. 3, $R_{25}$ and $R_{26}$ represent hydrogen, an alkyl group (e.g., methyl, ethyl, benzyl, amyl, decyl, etc.) and an aryl group such as a phenyl group, (e.g., phenyl, tolyl, ethylphenyl, etc.); and $X^5$ represents O, S, —NH—, —NR—, —NHCO—, a bond, etc. wherein R is as defined in col. 2. Illustrative examples include:

4-ethoxy-N-methyl-1,8-naphthalene dicarboxylic acid imide
4-dipentylamino-N-phenyl-6-methyl-1,8-naphthalene dicarboxylic acid imide
4-ethylthio-N-phenyl-1,8-naphthalene dicarboxylic acid imide
4-octadecylamino-N-ethyl-6-methyl-1,8-naphthalene dicarboxylic acid imide Oil-soluble 2-oxo-2,4-dihydrofuro[2,3-b] quinoxaline brightening agents used advantageously are represented by the formula:

(IX) 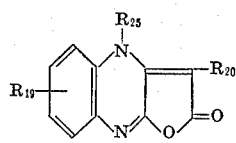

wherein $R_{25}$ is as defined above; $R_{19}$ and $R_{20}$ each represent a member such as hydrogen, alkyl, and aryl as defined previously under Formula V. Typical examples include the following:

4-methyl-3-phenyl-2-oxo-2,4-dihydrofuro[2,3-b] quinoxaline
3,4-diphenyl-2-oxo-2,4-dihydrofuro[2,3-b] quinoxaline
4,6-diethyl-3-phenyl-2-oxo-2,4-dihydrofuro[2,3-b] quinoxaline Essentially hydrophobic rigid organic solvents having a glass transition temperature, i.e., Tg, above about 25° C. used to advantage according to my invention are preferably photographically inert, i.e., do not change the sensitivity or developability of silver halide emulsions; they are compatible with the photographic processing solutions, are preferably colorless, transparent or translucent and have a refractive index that is in the same general range as the refractive index of the hydrophilic colloid that it is to be dispersed in. My rigid solvents are non-diffusible in the hydrophilic colloid layers containing them. My rigid solvents include polymers (i.e., copolymers, terpolymers, etc.), mixtures of polymers, etc. such that the solvent has a Tg above about 25° C. (ambient room temperature) and preferably above 40° C. When a physical mixture of compounds (as opposed to, for example, a copolymer) is used as my solvent, it is not the Tg of the individual components that is important, but the Tg of the composite mixture.

The glass transition temperature range is the range of temperatures over which the specific heat and thermal coefficient of an amorphous material undergoes discontinuities and is such that below this temperature range the material is glass-like in character and that above this temperature range, the material is fluid-like. The glass transition temperature, Tg, is the temperature coordinate of the upper asymptote of a graph of specific heat vs. temperature or thermal coefficient vs. temperature and is the temperature at which a glass-like material becomes completely rubbery or fluid-like.

Rigid solvents used advantageously include polymers having recurring units of the formula:

(X) 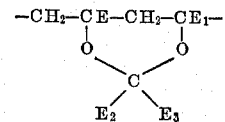

wherein E and $E_1$ each represent a member such as hydrogen and a methyl group such that not more than 50% of E and $E_1$ are methyl; $E_2$ and $E_3$ each represent a member such as hydrogen, an alkyl group, preferably alkyl having from 1 to 20 carbon atoms (e.g., methyl, ethyl, benzyl, phenethyl, amyl, decyl, pentadecyl, octadecyl, docosyl, etc.), and an aryl group such as a phenyl group (e.g., phenyl, tolyl, ethylphenyl, chlorophenyl, fluorophenyl, etc.) and a naphthyl group (e.g., α-naphthyl, β-naphthyl, etc.) such that not more than one of $E_2$ and $E_3$ is hydrogen.

My polymeric solvents include those having recurring units of:

(XI) 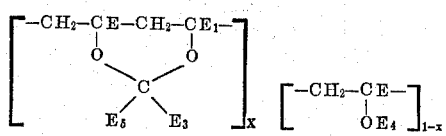

wherein E, $E_1$, $E_2$ and $E_3$ are as defined previously; $x$ is a number from about .4 to 1.0, preferably from .6 to .9; $E_4$ represents a member such as hydrogen and an alkyl group having from 1 to 20 carbon atoms (e.g., methyl, ethyl, benzyl, hydroxyethyl, aminoethyl, carboxyethyl, phenethyl, methoxyethyl, amyl, decyl, octadecyl, etc.); and a $COE_5$ group; and $E_5$ represents an alkyl group as described for $E_4$ and an aryl group (e.g., phenyl, tolyl, carboxyphenyl, aminophenyl, 4-methoxyphenyl, α-naphthyl, β-naphthyl, etc.).

My polymers are advantageously prepared by polymerizing

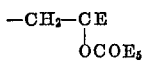

units, alone or with other vinyl polymers, then hydrolyzing to convert the $OCOE_5$ groups in the polymer to OH groups (usually leaving from about 1% to about 3% of the $OCOE_5$ groups on the polymer), then condensing the hydrolyzed polymer with a compound having the formula

The polymers in which up to 50% of E and $E_1$ represent methyl groups are advantageously prepared by polymerizing vinylacetate units with up to an equimolar amount of isopropenyl acetate (i.e., α-methyl vinyl acetate) units followed by the hydrolysis step and subsequently by condensation with the appropriate aldehyde or ketone.

Typical polymeric solvents used to advantage in my brightening compositions include the following:

(1) copoly(vinylacetal)(vinyl 2-carboxybenzoate)(vinyl alcohol)(vinyl acetate) 80:15:3:2 by weight
(2) copoly(vinylacetal)(vinyl 2-carboxybenzoate)(vinyl alcohol)(vinyl acetate) 90:5:3:2 by weight
(3) copoly(vinylacetal)(vinyl 2-carboxybenzoate)(vinyl alcohol)(vinyl acetate) 70:20:8:2 by weight
(4) copoly(vinyl butyral)(vinyl alcohol)(vinyl acetate) 88:9:3, by weight, m. wt. 34–38,000
(5) copoly(vinyl butyral)(vinyl alcohol)(vinyl acetate) 88:9:3, by weight, m. wt. 45–55,000
(6) copoly(vinyl butyral)(vinyl alcohol)(vinyl acetate) 80:17:3, by weight, m. wt. 24–28,000
(7) copoly(vinyl butyral)(vinyl alcohol)(vinyl acetate) 80:17:3, by weight, m. wt. 30–34,000
(8) copoly(vinyl butyral)(vinyl alcohol)(vinyl acetate) 80:17:3, by weight, m. wt. 55–60,000
(9) copoly(vinyl butyral)(vinyl alcohol)(vinyl acetate) 80:19:1, by weight, m. wt. 38–45,000
(10) copoly(6-methylene-2-phenyl-1,3-dioxalane)(vinyl alcohol)(vinyl acetate) 80:17:3 by weight
(11) copoly(6-methylene-2-α-naphthyl-1,3-dioxalane) (vinyl alcohol)(vinyl acetate) 80:17:3, by weight
(12) copoly(6-methylene-2-methyl-2-propyl-1,3-dioxalane)(vinyl alcohol)(vinyl acetate) 88:9:3, by weight
(13) copoly(6-methylene-2-octadecyl-1,3-dioxalane) (vinyl alcohol)(vinyl acetate) 88:9:3, by weight
(14) copoly(6-methylene-2,4-dimethyl-1,3-dioxalane) (vinyl alcohol)(α-methyl vinyl alcohol)(vinyl acetate) (α-methyl vinyl acetate) 80:7:7:3:3, by weight The above and other rigid, organic, essentially hydrophobic solvents of my invention are used alone or in mixtures as the permanent solvent for dispersing my brightening agents providing the solvent has a Tg above about 25° C. The solvents listed above can be used in mixture with an essentially hydrophobic organic material that has a Tg less than 25° provided the mixture has a Tg above about 25° C. The Tg's of mixtures can be estimated to a fair degree of accuracy by linear interpolation between the Tg's of the components.

It is advantageous to use a temporary solvent in the preparation of my brightening agent dispersions. Any of the photographically inert, low boiling organic solvents for the brightening agents and rigid permanent solvent are used to advantage, including for example, nitromethane, nitroethane, methyl acetate, ethyl acetate, propyl acetate, butyl acetate, ethyl formate, butyl formate, etc. Enough temporary solvent is used to make a liquid solution of the brightener and permanent solvent which is easily dispersed by conventional means into aqueous hydrophilic colloid. The temporary solvent is removed from the dispersion by evaporation and/or by washing, leaving a dispersion of a rigid solution of the brightening agent in the permanent solvent. Usually it is advantageous to prepare the dispersion so that the average diameter of the particles of rigid brightener solution in the permanent solvent is less than .4 micron. Very good dispersions have rigid brightener solution particles with an average diameter in the range from about .1 to about .2 micron and the preferred dispersions have rigid solution particles with an average diameter of less than 0.1 micron.

The ratio of brightening agent to permanent rigid solvent is usually in the range from about 1:1 to about 1:1000 parts by weight. A preferred ratio is in the range from about 1:10 to about 1:100. The optimum ratio will depend upon the particular materials being used and the results desired, and can be determined by methods well known in the art.

It is important that my hydrophobic brightener solution particles be dispersed in a hydrophilic colloid so that the material can be coated from an aqueous composition, and so that there are no adhesion problems at the interface between the brightener layer and contiguous layers such as support, baryta layer, photographic emulsion layer, etc.

Any of the well known hydrophilic colloids used in photographic elements are used to advantage, including gelatin, albumin, collodion, gum arabic, agar-agar, cellulose derivatives, such as, alkyl esters of carboxylated cellulose, hydroxyethyl cellulose, carboxymethyl hydroxyethyl cellulose, synthetic resins, such as the amphoteric copolymers described by Clavier et al. in U.S. Pat. 2,949,442, polyvinyl alcohol, polyvinyl pyrrolidone, and others well known in the art.

Any of the conventional photographic support materials are used advantageously for making my photographic elements, including photographic paper support, paper coated with a reflection pigment, e.g., baryta (i.e., barium sulfate), titanium dioxide, zinc oxide, etc., paper or other fibrous material coated with a hydrophobic resin [e.g., poly(ethylene terephthalate), polyethylene, polypropylene, poly-(3-methylbutene-1), poly(octene-1), poly(decene-1), polyamides, polyacetals, polycarbonates, cellulose triacetate, cellulose acetate butyrate, ethyl cellulose, etc.] which are advantageously treated with corona discharge techniques just prior to coating the first gelatin layer over the resin as described in U.S. patents, such as 3,220,842, 2,864,755, 2,864,756, etc., glass, conventional photographic film supports such as cellulose acetate cellulose nitrate etc., metal, etc. Baryta is coated in the range from about .9 to 6.5 g./ft.$^2$, preferably in range from 1.8 to 5.6 g./ft.$^2$.

Any hydrophilic colloid silver halide emulsions containing silver bromide, silver iodide, silver chloride, silver bromoiodide, silver chlorobromide, silver chlorobromoiodide, etc., well known in black-and-white and color photography are used advantageously in my elements. The silver halide emulsion layers for my color elements advantageously contain color-forming couplers or are of the type that are color developed with color developer solutions containing the appropriate couplers.

My hydrophilic colloids having dispersed in them my rigid solution of brightening agent, are coated in photographic elements wherever an ultraviolet-absorbing brightened is needed, e.g., in, over, or under a light-sensitive layer coated on any of the above supports, between two or more light-sensitive layers on any of the above supports, in a layer containing a reflection pigment such as are described above, etc. A particularly advantageous utility for my brightener dispersions is in photographic print material, and in image-receiving elements for diffusion transfer.

The brightening agents dispersed according to my invention are substantially more stable to prolonged exposure to light than the same brightening agents dispersed in solvents outside my invention.

The following examples are included for a further understanding of my invention:

EXAMPLE 1

Solutions are made of 4,4'-bis(5,7-di-t-amylbenzoxazol-2-yl)stilbene in copoly (vinyl acetal) (vinyl 2-carboxybenzoate) (vinyl alcohol) (vinyl acetate) 80:15:3:2 by weight and copoly (vinyl butyral) (vinyl alcohol) (vinyl acetate) 88:9:3 by weight, each a permanent solvent of my invention using enough of temporary solvent, i.e., ethyl acetate, to produce a liquid solution. Each of the two liquid solutions prepared are then dispersed in aqueous gelatin; the gelatin is chilled, noodled and the ethyl acetate removed by evaporation, leaving a dispersion of minute rigid particles having an average diameter less than .4 micron and containing the 4,4'-bis(5,7-di-t-amylbenzoxazol-2-yl)stilbene dissolved in the indicated permanent solvent. The composition of each of the dispersions is such that when reconstituted and coated on a support, there is 10 mg. of the brightener/ft.$^2$, 500 mg. of the permanent solvent/ft.$^2$ and 500 mg. of gelatin/ft.$^2$. Coatings are made of each of the dispersions on a transparent support.

EXAMPLE 2

Example 1 is repeated using copolybutyl methacrylate) (acrylic acid), 85:15, by weight, copoly(butylmethacrylate) (methacrylic acid) 85:15, by weight, and poly-(t-butylmethacrylate), all solvents outside my invention in place of the permanent solvents of my invention used in Example 1. The coatings are made so that the coating rates of brightener, permanent solvent and gelatin are the same as in Example 1. These coatings are used for controls in Example 3.

EXAMPLE 3

The fresh coatings made in Examples 1 and 2 are compared for brightener fading caused by exposure to a SANS (Simulated Average North Skylight-500 ft. candle filtered Xenon Fadeometer held at 70° F., 50% RH±1%) test. The brightener fading is monitored by plotting the density at 380 nm. vs. fading time and interpolating to obtain the half-life (T ½) of the 4,4'-bis-(5,7-di-t-amylbenzoxazol-2-yl)stilbene in each of the coatings. The density values used in the plots are uncorrected for by-product absorption, and corrected for stain present from solvent, gel and support. The results are summarized with the Tg values for the permanent solvents used.

TABLE 1

| Coating | Permanent Solvent Name | Tg °C. | T ½ (days SANS) of brightener |
|---|---|---|---|
| 1 (control) | Copoly (butyl methacrylate) (acrylic acid) 85:15 by weight. | +44 | 23.5 |
| 2 (control) | Poly (t-butyl methacrylate) | +107 | 18.2 |
| 3 (control) | Copoly (butyl methacrylate) (methacrylic acid) 85:15. | +66 | 21.3 |
| 4 | Copoly (vinyl acetal) (vinyl 2-carboxybenzoate) (vinyl alcohol) (vinyl acetate) 80:15:3:2, by weight. | +107 | 114.0 |
| 5 | Copoly (vinyl butyral) (vinyl alcohol) (vinyl acetate) 88:9:3. | +58.5 | 131.0 |

The results show up to more than seven times longer half life for the brightener in my coatings than the same brightener in coatings outside my invention.

EXAMPLE 4

Example 1 is repeated using equivalent weights of 4-(α-naphthotriazol-2-yl)-4'-octylstilbene, 4-(5,7-di-t-amylbenzothiazol-2-yl)-4'-(4-octyloxazol-2-yl)stilbene,
4,4'-bis-(5-octylbenzoxazol-2-yl)-α-methylstilbene,
4,β-(di-t-amylbenzoxazol-2-yl)styrene,
4,4'-bis(6-methylsulfonylbenzoxazol-2-yl)-stilbene,
4,4'-bis(5-methoxybenzoxazol-2-yl)stilbene,
4,4'-bis(6-chlorobenzoxazol-2-yl)stilbene,
4,4'-bis(6-docosylbenzoxazol-2-yl)stilbene,
4,4'-bis(5,7-di-t-amylbenzoxazol-2-yl)-3,3'-dimethylstilbene,
4,4'-bis(benzoxazol-2-yl)-2,2'-dioctadecylstilbene,
4,4'-bis(benzoxazol-2-yl)-2-phenylstilbene,
4,4'-bis(5,7-di-t-amylbenzoxazol-2-yl)-3,3'-dimethylstilbene,
4-(5,7-di-t-amylbenzothiazol-2-yl)-4'-phenylstilbene,
4,4'-bis(5-chlorobenzothiazol-2-yl)stilbene,
4,4'-bis(5,7-di-t-amylbenzimidazol-2-yl)-stilbene,
4,4'-bis(6-octylbenzoimidazol-2-yl)stilbene,
4,4'-bis-(α-naphthoxazol-2-yl)stilbene,
4,4'-bis(β,β-naphthoxazol-2-yl)-stilbene,
α,β-bis(5,7-dioctadecylbenzoxazol-2-yl)ethylene,
3-phenyl-7-[4'-chloro-6'-diethylamino-s-triazinyl-(2') amino]coumarin,
7-diethylamino-4-methylcoumarin,
7-[4',6'-dichloro-s-triazinyl-(2')ureido]-3-phenylcoumarin,
7-([4,5-a]naphthotriazol-2-yl)-3-phenylcoumarin,
2,5-bis(5,7-di-t-amylbenzoxazol-2-yl)thiophene,
2,5-bis(5,7-diphenylbenzoxazol-2-yl)thiophene,
2,5-bis(α-naphthimidazol-2-yl)thiophene,
1,1-dioxydibenzthiophene,
6-ethyldibenzthiophene,
5-ethyldibenzfuran,
1-phenylcarbazole,
fluorene,
9-cyanoanthracene,
9,10-diphenylanthracene, in place of 4,4'-bis(5,7-di-t-amylbenzoxazol-2-yl)stilbene. The brightening agents in these coatings of dispersions of my invention have very good stability to prolonged exposure to light.

EXAMPLE 5

Solutions are made of each of the brighteners and polymeric solvents indicated in the table below by dissolving 10 mg. of brightener in 24 ml. of a 10% ethyl acetate solution of the polymeric solvent. The resulting solutions are hand-coated on pieces of a transparent film support, the ethyl acetate removed by evaporation, leaving a thin, solid solution containing between 7.5 and 15 mg./ft.$^2$ of brightener at a ratio of 1:240 in the polymer. The brightener loss is determined by measuring the peak U.V. density (at λ max. of absorption band) before and after four weeks of fading on a SANS (simulated average north skylight) fadeometer at an intensity of 500 ft. candles at 70° F., 50% RH. The original density at λ max. and the density loss from four weeks of fading on the SANS fadeometer are listed in the following table:

TABLE II

| Brightener | Rigid solvent | Brightener stability | |
|---|---|---|---|
| | | Original density at λ max. | Density loss from 4 weeks SANS fading |
| A | X (control) | 1.35 | .48 |
| A | Y | 1.46 | .19 |
| B | X (control) | 0.94 | .52 |
| B | Y | 1.05 | .25 |
| C | X (control) | 0.93 | .17 |
| C | Y | 0.95 | .13 |
| D | X (control) | 1.22 | .97 |
| D | Y | 1.21 | .67 |
| E | X (control) | 1.00 | 1.94 |
| E | Y | 1.07 | .74 |
| F | X (control) | .50 | 1.45 |
| F | Y | .53 | .32 |
| G | X (control) | .53 | 1.48 |
| G | Y | .50 | .37 |
| H | X (control) | .76 | .11 |
| H | Y | .75 | .05 |

[1] Gone.

The identity of the brighteners A through J and rigid solvents X and Y are given below:

Brightener

A: 4,4'-bis(5,7-di-t-amylbenzoxazol-2-yl)stilbene

B: 3-phenyl-7-[4'-chloro-6'-diethylamino-s-triazinyl-(2')amino]coumarin
C: 2,5-bis(5,7-di-t-amylbenzoxazol-2-yl)thiophene
D: α-(benzoxazol-2-yl)-4'-cyanostilbene
E: 7-diethylamino-4-methylcoumarin
F: 9-cyanoanthracene
G: 9,10-diphenylanthracene
H: 4-methyl-3-phenyl-2-oxo-2,4-dihydrofuro[2,3-b]quinoxaline Polymeric solvent X: copoly (butylacrylate)(acrylic acid) 60:40 by weight (control outside invention), Tg=37° C.
Y: copoly (vinyl acetyl)(vinyl 2-carboxybenzoate)(vinyl alcohol)(vinyl acetate) 80:15:3:2 by weight, Tg=107° C.

The results show that all the brightening agents used are up to two times more stable to the SANS fading when dissolved in my rigid solvent than when dissolved in a rigid solvent outside my invention.

EXAMPLE 6

Solutions are made of each of the brighteners and polymeric solvents indicated in Table III by dissolving 10 mg. of the brightener in 3 ml. of a 10% ethyl acetate solution of the polymeric solvent. Each solution is dispersed in a separate 6 ml. of 5% aqueous bone gel using a conventional dispersing technique. Each dispersion is dried to eliminate ethyl acetate, reconstituted and coated on different pieces of a transparent support to give 10 mg./ft.$^2$ of brightener (density at λ max. 0.9 to 1.1), 300 mg./ft.$^2$ of polymeric solvent and 300 mg./ft.$^2$ of gel on the support. The brightener loss is determined by measuring the peak U.V. density (at λ max. of absorption band) before and after four weeks of fading on a SANS fadeometer using the conditions described in Example 5. The brightening agent loss is indicated by the density loss reported in the following table:

TABLE III

| Coating | Brightener | Rigid solvent | Density loss from 4 weeks SAN |
|---|---|---|---|
| 1 | A | Control (outside invention) copoly (butylmethacrylate) (methacrylic acid) 85:15, by weight. | .85 |
| 2 | A | Solvent of invention copoly (vinyl acetal) (vinyl 2-carboxybenzoate) (vinyl alcohol) (vinyl acetate) 80:15:3:2 by weight. | .41 |
| 3 | B | Control (same as in coating 1 above) | .52 |
| 4 | B | Solvent of invention (same as in coating 2 above). | .15 |

Brightener A, i.e., 4,4'-bis(5,7-di-t-amylbenzoxazol)stilbene and B, i.e., 3-phenyl-7-[4'-chloro-6'-diethylamino-s-triazinyl-(2')amino]coumarin are from 2 to 3 times more stable in my coatings than in control coatings.

EXAMPLE 7

Example 6 is repeated but using the brightening agents and rigid solvents indicated in Table IV in place of those used in Example 6, and coating the reconstituted brightener compositions to give 10 mg./ft.$^2$ of brightening agent, 500 mg./ft.$^2$ of rigid solvent and 500 mg./ft.$^2$ of gel on the support. The brightening agent loss in these coatings from four weeks SANS is indicated by the density loss in the following table:

| Coating | Brightener | Rigid solvent | Density loss from 4 weeks SANS |
|---|---|---|---|
| 1 | A | Control (outside invention) copoly (butylmethacrylate) (methacrylic acid) 85:15, by weight. | .74 |
| 2 | A | Control (outside invention) poly-(t-butylmethacrylate). | .65 |
| 3 | A | Solvent of invention copoly (vinyl butyral) (vinyl alcohol) (vinyl acetate) 88:9:3, by weight. | .30 |
| 4 | C | Control (same as in coating 2, Table IV). | .50 |
| 5 | C | Solvent of invention used in coating 3, Table IV. | .21 |

Brightener A, i.e., 4,4'-bis(5,7-di-t-amylbenzoxazol-2-yl)stilbene and Brightener C, i.e., 2,5-bis(5,7-di-t-amylbenzoxazol-2-yl)thiophene are up to more than two times more stable in my coatings than in the control coatings.

EXAMPLE 8

Example 6 is repeated but using the rigid polymeric solvents and brightening agents indicated in Table V in place of the solvents and brighteners used in Example 6. The amounts of brightener, rigid solvent and gel are adjusted so the coatings made from the reconstituted dispersions contain 10 mg. of brightener, 500 mg. of rigid solvent and 500 mg. of gel per square foot of coating. The loss in brightening agent produced in the coatings by four weeks SANS fading is indicated by the density loss data in the following table:

TABLE V

| Coating | Brightener | Rigid solvent | Density loss from 4 weeks SANS |
|---|---|---|---|
| 1 | A | Control (outside invention) (for coatings 2, 3, 4, and 5) copoly (vinyl formal) (vinyl alcohol) (vinyl acetate). | .69 |
| 2 | A | Copoly (vinyl butyral) (vinyl alcohol) (vinyl acetate) 88:9:3, M.W. 34-38,000. | .27 |
| 3 | A | Copoly (vinyl butyral) (vinyl alcohol) (vinyl acetate) 80:17:3, M.W. 30-34,000. | .28 |
| 4 | A | Copoly (vinyl butyral) (vinyl alcohol) (vinyl acetate) 80:17:3, M.W. 55-60,000. | .29 |
| 5 | A | Copoly (vinyl butyral) (vinyl alcohol) (vinyl acetate) 80:19:1, M.W. 38-45,000. | .30 |
| 6 | A | Control (outside invention) for coatings 7 and 8 copoly (butyl methacrylate) (methacrylic acid) 85:15 by weight, Tg 66° C. | .65 |
| 7 | A | Copoly (vinyl butyral) (vinyl alcohol) (vinyl acetate) 88:9:3, M.W. 45-55,000. | .29 |
| 8 | A | Copoly (vinyl butyral) (vinyl alcohol) (vinyl acetate) 80:17:3, M.W. 24-28,000. | .27 |
| 9 | C | Control rigid solvent used in coating 1. | .53 |
| 10 | C | Rigid solvent used in coating 2. | .20 |
| 11 | C | Rigid solvent used in coating 3. | .20 |
| 12 | C | Rigid solvent used in coating 4. | .20 |
| 13 | C | Rigid solvent used in coating 5. | .19 |

Brightener A, i.e., 4,4'-bis(5,7-di-t-amylbenzoxazol-2-yl)stilbene and Brightener C, i.e., 2,5-bis(5,7-di-t-amylbenzoxazol-2-yl)thiophene in coatings made according to my invention are up to more than two times more stable than the same brighteners in control coatings outside the invention.

EXAMPLE 9

The dispersions of my brightener-solvent solutions in gelatin described in Examples 1, 3, 4, 6, 7 and 8 are coated on a baryta-coated paper support in place of the transparent support used in the earlier examples. The brightening agents in these coatings have exceptionally good stability to prolonged exposure to light.

EXAMPLE 10

The dispersions of my brightener-solvent solutions in gelatin described in Examples 1, 3, 4, 6, 7 and 8 are dispersed into portions of a baryta coating composition and the resulting compositions coated on pieces of a paper support. The brightening agents in these coatings have exceptionally good stability to prolonged exposure to light.

EXAMPLE 11

The dispersions of my brightener-solvent solutions in gelatin described in Examples 1, 3, 4, 6, 7 and 8 are repeated using equivalent weights of copoly (vinyl acetal) (vinyl 2-carboxybenzoate) (vinyl alcohol) (vinyl acetate) 90:5:3:2 by weight, copoly (vinyl acetal) (vinyl 2-carboxybenzoate) (vinyl alcohol) (vinyl acetate) 70:20:8:2 by weight, copoly (vinyl butyral) (vinyl alcohol) (vinyl acetate) 80:17:3 by weight, m. wt. 30-34,000, copoly (vinyl butyral) (vinyl alcohol) (vinyl acetate) 80:17:3, by weight, m. wt. 55-60,000, copoly (vinyl butyral)

(vinyl alcohol) (vinyl acetate) 80:19:1, by weight, m. wt. 38–45,000, copoly (6-methylene-2-phenyl-1,3-dioxalane) (vinyl alcohol) (vinyl acetate) 80:17:3, by weight, copoly (6-methylene-2-α-naphthyl-1,3-dioxalane) (vinyl alcohol) (vinyl acetate) 80:17:3, by weight, copoly (6-methylene-2-methyl - 2 - propyl-1,3-dioxalane) (vinyl alcohol) (vinyl acetate) 88:9:3, by weight, copoly (6-methylene - 2 - octadecyl-1,3-dioxalane) (vinyl alcohol) (vinyl acetate) 88:9:3, by weight, and copoly (6-methylene-2,4-dimethyl-1,3-dioxalane) (vinyl alcohol) (α-methyl vinyl alcohol) (vinyl acetate) (α-methyl vinyl acetate) 80:7:7:3:3, by weight, in place of the permanent solvents used in Examples 1, 3, 4, 6, 7 and 8, and coating the dispersions on pieces of a paper support instead of a transparent support. The brightening agents in these coatings of my invention have excellent stability to prolonged exposure to the SANS test.

EXAMPLE 12

Paper and baryta coated paper supports are coated with the dispersions of my brightener-solvent solutions described in Examples 1, 3, 4, 6, 7, 8, 10 and 11 and these coatings are overcoated with an ordinary gelatin-silver chlorobromide emulsion. The dried coatings are given a light image exposure and developed to a silver image with an aqueous alkaline solution containing hydroquinone and p-methylaminophenol followed by water washing, fixing in a conventional alkali metal thiosulfate bath, washed and dried. The highlight areas of the prints exhibit a high degree of brightening from the brighteners even after prolonged exposure to light.

EXAMPLE 13

A piece of photographic paper coated with a gelatin layer containing a dispersion of 4,4'-bis(5,7-di-t-amylbenzoxazol-2-yl)stilbene dissolved in copoly (vinyl butyral) (vinyl alcohol) (vinyl acetate) 88:9:3, by weight, m. wt. 34–38,000 and a dispersion of baryta is coated in succession (over said brightening layer) with (1) an ordinary blue-sensitive gelatino silver chlorobromide emulsion and a dispersion of a yellow dye-forming coupler of the type described in McCrossen et al., U.S. Pat. 2,875,057, (2) a gelatin interlayer, (3) a gelatin layer containing an ordinary green-sensitized gelatino-silver chlorobromide emulsion, a dispersion of a magenta dye-forming coupler, such as, one of the couplers described in Loria et al. U.S. Pat. 2,600,788, (4) a gelatin layer, (5) a gelatin layer containing an ordinary red-sensitized gelatino silver chlorobromide emulsion, a dispersion of a cyan dye forming coupler such as is described in Fierke U.S. Pat. 2,801,171, and (6) a gelatin protective layer. The photographic element is exposed in an intensity scale sensitometer and then color processed as described in Example 1, columns 5 and 6 of Van Campen U.S. Pat. 2,956,879 using 12 minutes development in the color developer. The processed color print has brightened highlights that even after prolonged exposure to light retain their brightness to a much higher degree than control color prints made by the same way, excepting that the brightening agent is dispersed as a solution in di-n-butylphthalate.

EXAMPLE 14

Example 13 is repeated, using equivalent weights of copoly (vinyl butyral) (vinyl alcohol) (vinyl acetate) 80:17:3 by weight, m. wt. 24–28,000, m. wt. 30–34,000, m. wt. 55–60,000, 80:19:1 m. wt. 38–45,000 copoly (vinyl acetal) (vinyl 2-carboxybenzoate) (vinyl alcohol) (vinyl acetate) 80:15:3.2 by weight in place of the rigid solvent used in Example 13. Results similar to those in Example 13 are obtained.

EXAMPLE 15

Example 13 is repeated using equivalent weights of the brightening agents used in Example 4 in place of 4,4'-bis (5,7-di-t-amylbenzoxazol-2-yl) stilbene used in Example 13. Results similar to those in Example 13 are obtained.

My brightening compositions are advantageously used in image-receiving elements that are used to receive diffusion transfer images during the diffusion transfer process. In these processes, a light-sensitive diffusion transfer element containing a light-image exposed silver halide emulsion is processed with the exposed emulsion layer in contact with the silver precipitating layer of an image-receiving element in the presence of a silver halide developing agent, such as hydroquinone, 1-phenyl-3-pyrazolidone, p-methylaminophenol, etc., a silver halide solvent or complexing agent, such as an alkali metal thiosulfate, ammonium thiosulfate, an alkali metal thiocyanate, ammonium thiocyanate, etc. In a particularly useful process, a thickening agent, such as carboxymethylcellulose, carboxyethylcellulose, etc. is used. During development, undeveloped silver halide forms a complex with the complexing agent which diffuses in an imagewise manner to the silver-precipitating layer on the image-receiving element where a silver image is precipitated from the silver halide complex. In an integral element, a silver halide emulsion coated over a silver precipitating layer is removed such as by washing, to disclose the transferred image. In a color diffusion transfer process, an image-exposed light-sensitive silver halide color diffusion transfer element is contacted with the receiving layer of an image-receiving element in the presence of a developer solution which causes the release of a diffusible dye image that transfers to the mordanted receiving layer. The desired dye image remains in the receiving layer when the receiving element is separated from the developed diffusion transfer element. The diffusible dye image is formed from an incorporated non-diffusible coupler that couples with an imagewise pattern of oxidized primary aromatic amine color developing agent, produced by development of light-exposed silver halide. In another system, the dye image is formed from incorporated dye developing agents, such as hydroquinone derivatives that contain a chromophore as a substituent; the hydroquinone form of these compounds forms in the alkaline developer solution a diffusible dye while the dye developer that is oxidized to the quinone form (when it develops light-exposed silver halide to silver) is insoluble and does not diffuse to the image-receiving layer.

My brightening compositions are advantageously used in image-receiving elements. My image-receiving elements usually comprise a support as described previously that has been coated in succession with (1) a baryta layer containing my brightening composition, and (2) an image-receiving layer for a silver image comprising any of the hydrophilic colloids such as have been described before, containing a dispersion of a silver precipitating agent or an image-receiving layer for a dye image comprising any of the hydrophilic colloids such as have been described before, containing a basic mordant for mordanting acid solubilized diffusible dyes. Usually it is advantageous to have a hydrophobic resin layer between the baryta layer and the image-receiving layer. Hydrophobic resins that are advantageously used include poly(ethylene terephthalate), polyethylene, polypropylene, poly-(3-methylbutene-1), poly(octene-1), poly(decene - 1), polyamides, polyacetate, polycarbonates, cellulose, triacetate, cellulose acetate butyrate, ethyl cellulose, etc.; preferably the hydrophobic resin layer is treated with corona discharge techniques just prior to coating the first hydrophilic colloid layer over the resin as described in U.S. patents such as 3,220,842, 2,864,755, 2,864,756, etc. In one alternative structure, the baryta layer and brightening composition layers are coated separately between the support and image-receiving layer. In still another alternative structure, the image-receiving element comprises a support coated with a hydrophilic colloid layer containing both my brightening composition and a silver precipitating agent or mordant (for a dye transfer image).

Any suitable silver precipitant from the prior art is advantageously used in my receiving layer. As examples of suitable silver precipitating agents and of image-receiving elements containing such silver precipitating agents, reference may be made to U.S. Pat. Nos. 2,698,237, 2,698,238 and 2,698,245, 2,774,667, 2,823,122, 3,396,018 and 3,369,901. The noble metals silver, gold, platinum, etc. in the colloidal form are particularly useful.

Noble metal nuclei are particularly active and useful when formed by reducing a noble metal salt using a borohydride or hypophosphite in the presence of a colloid as described in Rasch, U.S. Patent application Ser. No. 796,552, filed Feb. 4, 1969. The metal nuclei are prepared in the presence of a proteinaceous colloid such as gelatin and coated on the receiving element. The coating composition generally contains not only nuclei, but also reaction products which are obtained from reducing the metal salt.

The amount of colloid used in preparing the above active noble metal nuclei can be varied depending upon the particular colloid, reducing agent, ratio of proportions, etc. Typically, about 0.5% to about 20%, by weight, based on the total reaction mixture of colloid is used, preferably from about 1% to about 10%.

In a particularly useful embodiment, 30 to 80 $\mu$g./ft.$^2$ of the active noble metal nuclei in 80 mg. of colloid (solids basis) is coated per square foot of support. The colloid binder is advantageously coated in a range of about 5 to about 500 mg./ft.$^2$. Suitable concentrations on the receiving sheets of active noble metal nuclei as disclosed above can be about 1 to about 200 $\mu$g./ft.$^2$ Other silver precipitants can be coated in a concentration of up to 5 mg./ft.$^2$.

Any of the prior art mordants that have a charge oppsite to the charge of the dye being transferred are used to advantage in my image-receiving elements for dye transfer images. Since most of the useful photographic image-transfer dyes have acidic solubilizing groups, basic or cationic mordants are generally used. Typical mordants are organic quaternary phosphonium salts, organic ternary sulfonium salts and organic quaternary ammonium salts. Suitable mordants include polymers of amino guanidine derivatives of vinyl methyl ketone described in Minsk, U.S. Pat. 2,882,156. Other suitable mordants include the 2-vinyl pyridine polymer metho-p-toluene sulfonate, poly 4-vinyl-pyridine, thorium salts and similar compounds described in Sprague et al., U.S. Pat. 2,484,430.

A particularly useful class of mordanting compositions is disclosed in Bush, U.S. Pat. 3,271,147. Basic or cationic, nonpolymeric mordant compounds of Bush include quaternary ammonium and phosphonium, and ternary sulfonic composition in which there is linked to the N, P or S onium atom at least one hydrophobic ballast group, such as long-chain alkyl or substituted alkyl groups. The onium atom can be part of an open-chain or of a heterocyclic ring and there can be more than one onium ring in the molecule. When referring to the nonpolymeric nature of the mordant compounds of such mordanting compositions, I mean that the cationic or the basic mordant does not have regularly occurring units containing the cationic group beyond the dimer structures. However, the ballast group attached to the quaternary or ternary atom of the cation group can contain repeating groups such as tetraethoxy, polymethylene, etc.

EXAMPLE 16

A silver image transfer receiving element is made by coating a paper support in succession with (1) aqueous gelatin having dispersed in it (a) a solution of 4,4'-bis-(5,7-di-t-amylbenzoxazol-2-yl)stilbene in copoly (vinyl acetal)(vinyl 2 - carboxybenzoate)(vinyl alcohol)(vinyl acetate) 80:15:3:2, by weight prepared for coating as described in Example 1 and (b) baryta, (2) a layer of polyethylene that is treated by corona discharge (as described in U.S. patents, such as 3,220,842, 2,864,755, 2,864,756, etc.) just prior to coating with (3) a layer of aqueous gelatin containing about 10% by weight of a dispersion of colloidal silver so that about 150 $\mu$g. of colloidal silver are coated per square foot.

EXAMPLE 17

A silver miage transfer receiving element is made by coating a paper support in succession with (1) a layer of an aqueous gelatin baryta coating composition, (2) a layer of aqueous gelatin having dispersed in it a solution of 4,4'-bis(5,7-di-t-amylbenzoxazol)stilbene in copoly (vinyl butyral)(vinyl alcohol)(vinyl acetate) 88:9:3 by weight, prepared for coating and coated as described in Example 7, and (3) a layer of aqueous gelatin containing about 10% by weight of a dispersion of colloidal silver so that about 150 $\mu$g. of colloidal silver are coated per square foot.

EXAMPLE 18

A silver image transfer receiving element is made by coating a paper support with a layer of aqueous gelatin having dispersed in it a solution of 3-phenyl-7-[4'-chloro-6'-diethylamino-s-triazinyl-(2')-amino]coumarin in copoly (vinyl butyral)(vinyl alcohol) (vinyl acetate) 88:9:3 by weight prepared for coating as described in Example 7 (but using the immediate brightening agent in place of those used in Example 7), but also having dispersed in it colloidal silver and coating so that there is 10 mg. of the brightener, 500 mg. of rigid solvent, 150 $\mu$g. of colloidal silver and 500 mg. of gelatin per square foot.

EXAMPLE 19

A separate piece of light image exposed photographic element comprising a film support coated with a negative speed gelatin silver bromoiodide emulsion is contacted in the dark with the colloidal silver containing layer of a piece of the image receiving element made in each of Example 16, 17 and 18 in the presence of a conventional silver image transfer developer composition comprising water, alkali, hydroquinone, sodium thiosulfate, etc. After development is completed, the image receiving element is stripped from the processed photographic element. The highlight portions of the silver image reproductions in each of the receiving sheets are substantially brightened by my brightener. Comparisons made with similar prints made using identical image-receiving elements, excepting that the brightener is dissolved in copoly (vinyl formal) (vinyl alcohol) (vinyl acetate) instead of the polymeric solvents used in Examples 16, 17 and 18, show that my prints retain the brightener for substantially longer periods of exposure to light.

EXAMPLE 20

A dye image transfer receiving element is made like the receiving element in Example 16 excepting that the layer 3 is replaced by a layer of aqueous gelatin containing the mordant cetyl trimethyl ammonium bromide so that 150 mg. of mordant and 300 mg. of gelatin are coated per square foot.

EXAMPLE 21

A dye image transfer receiving element is made like the receiving element in Example 17 excepting that the layer 3 is replaced by a layer of aqueous gelatin containing the mordant cetyl trimethyl ammonium bromide so that 150 mg. of mordant and 300 mg. of gelatin are coated per square foot.

EXAMPLE 22

A dye transfer receiving element is made like the receiving element in Example 18 excepting that the colloidal silver is replaced by the mordant cetyl trimethyl ammonium bromide so that 150 mg. of mordant are coated per square foot.

EXAMPLE 23

Separate pieces of a color film described in Example 1 of Barr et al., U.S. Pat. 3,227,551, are exposed to an original colored image and contacted with the mordant containing layer of the receiving elements made in Examples 20, 21 and 22 in the presence of a developer solution as described in Example 1 of U.S. Pat. 3,227,551. After 5 minutes development at 85° F., the receiving elements with their color positive reproductions of the original image are stripped from the processed color film. The highlight areas of these color prints (in the receiving elements) are brightened by my brightener composition. Comparisons made with color prints produced exactly the same way, except that the brightening agent in the dye image-receiving elements is dissolved in di-n-butylphthalate, show that the brightener in color prints made according to my invention is substantially more stable to prolonged exposure to light than color prints outside my invention.

Brightening agents of Formula II in which G and G' each represent C and X and X' each represent 0, S or NR are advantageously synthesized by reacting one mole of a compound of Formula XII with two moles of a compound of Formula XIII, XIV, V or VI.

(XII)

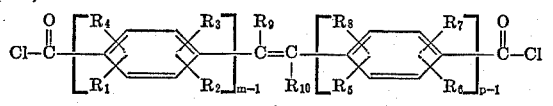

(or corresponding dicarboxylic acid)

(XIII)

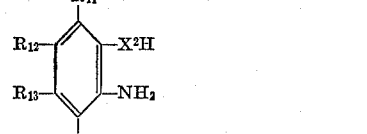

(XIV)

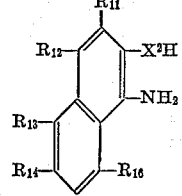

(XV)

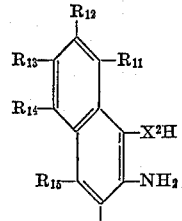

(XVI)

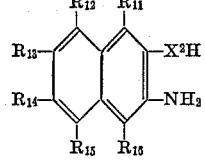

wherein $R_1$ through $R_{16}$, $m$ and $p$ are as defined previously and $X^2$ represents O, S or NR in which R is as defined previously. Many of the bis(benzoxazol-2-yl)stilbenes used according to my invention are described in U.S. Pat. 3,260,715 and in U.S. Pat. 3,322,680. The 4,4'-bis(benzothiazol - 2 - yl)stilbenes, 4,4' - bis(naphthothiazol-2-yl) stilbenes, the 4,4' - bis(benzimidazol - 2 - yl)stilbenes and 4,4' - bis(naphthimidazol - 2 - yl)stilbenes are advantageously prepared by methods analagous to those shown for preparing the 4,4'-bis(benzoxazol-2-yl)stilbenes.

Unsymmetrical substituted stilbenes of Formula II in which X and X' are O, S or NR are advantageously synthesized by reacting the di(acid chloride) of stilbene with an excess of phenol in alkaline solution to produce the diester. 4-Carboxy-4'-phenoxycarbonyl stilbene is prepared by partial hydrolysis of the diester, then the free carboxylic acid group is transformed into the acid chloride by treatment with thionyl chloride. The acid chloride is then reacted with the appropriate compound of Formula XII, XIII, XIV, XV or XVI. The remaining phenyl ester group is then hydrolyzed, to the carboxy group, which is converted to the acid chloride and then this intermediate reacted with the appropriate compound of Formula XII, XIII, XIV, XV or XVI to make the desired unsymmetrical stilbene.

Brighteners of Formula II in which X, X', G and G' are N, and $m$ and $p$ are 2, are advantageously made by diazotizing 4,4'-diaminostilbene, then coupling each mole of the 4,4'-diazotized stilbene with two moles of o-nitroaniline to make the corresponding 4,4'-bis(2-nitrophenylazo) stilbene which is then reduced with zinc dust and sodium hydroxide in alcohol to produce the 4,4'-bis-(benzotriazol-2-yl) stilbene. The symmetrical as well as the unsymmetrical stilbene brighteners with benzotriazol-2-yl groups are known in the prior art. The brightener 4-(α-naphthotriazol-2-yl) - 4' - octylstilbene is described generically by U.S. Pat. 3,406,070.

Brighteners of Formula II in which X and X' are CR groups and G and G' are nitrogen atoms, and $m$ and $p$ are 2, are advantageously prepared by treating a compound of the formula:

(XVIII)

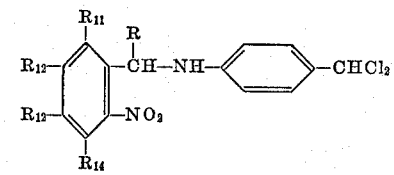

wherein R, $R_{11}$, $R_{12}$, $R_{13}$ and $R_{14}$ are as defined previously, with powdered zinc to produce the corresponding stilbene compound followed by treatment with tin and hydrochloric acid to produce the desired brightener compound.

The brightener 4-(5,7-di-t-amylbenzothiazol-2-yl)-4'-(4-octyloxazol-2-yl) stilbene is advantageously prepared by reacting 4-amido-4'-(5,7-di-t-amylbenzothiazol-2-yl) stilbene with α-bromomethyl octyl ketone, then reacting the reaction product with $NH_3$, then removing water. The brightener 4-(5,7-di-t-amylbenzothiazol - 2 - yl)-4'-(4-octylimidazol-2-yl) stilbene is advantageously prepared by reacting 4-amido-4'-(5,7-di-t-amylbenzothiazol-2-yl) stilbene with α-bromomethyl octylketone, reacting the reaction product with $NH_3$ removing one mole of water, treating again with $NH_3$ and again removing one mole of water.

The coumarins, thiophenes (including the dibenzthiophenes and 1,1-dioxydibenzthiophenes), furans (and dibenzfurans), anthracenes, pyrazolines, fluorenes, carbazoles, 1,8-naphthalic acid imides, 2-oxo-2,4-dihydrofuro-[2,3-b]quinoxalines are known in the art and those not specifically described are readily prepared by well-known methods.

The polymers used to advantage as solvents according to my invention are prepared by methods well known in the polymer art. Many of the polymers are available commercially.

The invention has been described in detail with particular reference to certain preferred embodiments thereof, but it will be understood that variations and modifications can be effected within the spirit and scope of the invention.

I claim:

1. A brightening composition comprising a hydrophilic colloid containing a dispersion of a solid solution of (A) at least one oil-soluble brightening agent selected from the class consisting of a vinylene brightening agent, a coumarin, a thiophene, a furan, an anthracene, a pyrazoline, a fluorene, a carbazole, a 1,8-naphthalic acid imide and a 2-oxo-2,4-dihydrofuro[2,3-b]quinoxaline brightening agent dissolved in (B) a rigid, essentially hydrophobic organic solvent having a glass transition temperature above about 25° C., said solvent being a polymer containing recurring units of:

(I)

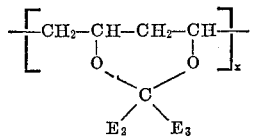

and (II)

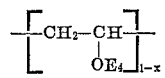

wherein $E_2$ and $E_3$ each represent a member selected from the class consisting of hydrogen, an alkyl group having from 1 to 20 carbon atoms, and an aryl group, such that at least one of $E_2$ and $E_3$ is a substituent other than hydrogen; $E_4$ represents a member selected from the class consisting of hydrogen, alkyl and $COE_5$; $E_5$ represents a group selected from the class consisting of an alkyl group, and an aryl group; and $x$ represents a number in the range of from about 0.4 to 1.0, substantially all of said brightening agent in said hydrophilic colloid being dispersed in said rigid solvent.

2. The brightening composition of claim 1 in which said organic solvent is copoly(vinyl acetyl) (vinyl 2-carboxybenzoate) (vinyl alcohol) (vinyl acetate) 80:15:3:2, by weight.

3. The brightening composition of claim 1 in which said organic solvent is copoly(vinyl butyral) (vinyl alcohol) (vinyl acetate) 88:9:3, by weight.

4. A brightening composition of claim 1 containing dispersed baryta.

5. A brightening composition of claim 1 containing a dispersed silver precipitating agent.

6. The brightening composition of claim 1 in which said hydrophilic colloid is gelatin.

References Cited

UNITED STATES PATENTS

| | | | |
|---|---|---|---|
| 2,193,035 | 3/1940 | Matthews et al. | 260—73 L X |
| 2,508,295 | 5/1950 | Reckmeyer | 96—84 X |
| 2,410,225 | 10/1946 | Macht et al. | 260 73 L |
| 2,582,357 | 1/1952 | Sargent | 252—301.2 W |
| 3,020,155 | 2/1962 | Yackel et al. | 96—96 X |
| 3,178,445 | 4/1965 | Maeder | 252—301.2 W |
| 3,203,956 | 8/1965 | Orelup | 252—301.2 W X |
| 3,351,591 | 11/1967 | Siegrist et al. | 252—301.2 W |
| 3,359,102 | 12/1967 | Pattijn et al. | 96—82 X |
| 3,413,233 | 11/1968 | Siegrist et al. | 252—301.2 W |
| 3,558,316 | 1/1971 | Keberle et al. | 96—82 |
| 2,828,204 | 3/1958 | Taylor et al. | 96—114 |
| 3,260,715 | 7/1966 | Saunders | 252—301.2 |
| 3,269,840 | 8/1966 | Pattyn et al. | 252—301.2 |
| 3,406,070 | 10/1968 | Oetiker et al. | 96—114 |
| 3,449,257 | 6/1969 | Tuite et al. | 252—301.2 |
| 3,518,088 | 6/1970 | Dunn et al. | 96—76 |

FOREIGN PATENTS

| | | |
|---|---|---|
| 1,122,643 | 8/1968 | Great Britain. |
| 571,662 | 9/1945 | Great Britain 260—73 L |

OTHER REFERENCES

Schildknecht, C. F., Vinyl and Related Polymers, Wiley, New York (1959), pp. 333, 334, 338–341, 350–352 and 363 relied on.

Yarsley, V. E., et al., Cellulose Plastics, London, Iliffe Books, Ltd. (1964), pp. 109, 115, 117 and 118 relied on.

ROBERT F. BURNETT, Primary Examiner

J. C. GIL, Assistant Examiner

U.S. Cl. X.R.

96—82, 84; 117—33.5 R, 33.5 T